United States Patent [19]

Chess, Jr. et al.

[11] Patent Number: 4,842,787

[45] Date of Patent: Jun. 27, 1989

[54] HIGH SPEED PROCESS FOR PRODUCTION OF ORIENTED STRUCTURAL YARN/POLYMER MATRIX COMPOSITE STRUCTURAL PARTS

[75] Inventors: Henry L. Chess, Jr., Bloomington; Roger A. Engdahl, St. Paul; James A. Wedin, Minnetonka, all of Minn.

[73] Assignee: Xerkon, Inc., Minneapolis, Minn.

[21] Appl. No.: 944,446

[22] Filed: Dec. 22, 1986

[51] Int. Cl.$^4$ ............... B29C 35/02; B29C 43/56; B29C 43/58; B29C 43/10

[52] U.S. Cl. ............... 264/40.6; 156/309.6; 264/40.1; 264/102; 264/136; 264/137; 264/138; 264/257; 264/313; 264/316; 264/322; 264/325; 264/510; 264/522; 264/528; 264/548; 264/552; 264/553; 264/571; 264/DIG. 57; 264/DIG. 64; 264/DIG.65

[58] Field of Search ............... 264/40.1, 522, 528, 264/546, 548, 552, 553, 571, 137, 258, 271.1, 279, 313, 316, 322, 324, 325, 40.6, 257, 102, DIG. 56, 136, DIG. 64, 138, DIG. 65, 510; 156/309.6, 439, 311

[56] References Cited

U.S. PATENT DOCUMENTS

| | | | |
|---|---|---|---|
| 3,559,236 | 2/1971 | Merritt | 425/89 |
| 3,687,776 | 8/1972 | Allard et al. | 156/309.6 |
| 4,416,929 | 11/1983 | Krueger | 428/110 |
| 4,478,771 | 10/1984 | Schreiber | 264/552 |
| 4,539,249 | 9/1985 | Curzio | 264/552 |
| 4,681,049 | 7/1987 | Vees et al. | 428/102 |

OTHER PUBLICATIONS

Oleesky and Mohr, "Handbook of Reinforced Plastics"; The Society of the Plastics Industry, Inc.; Rheinhold Publ; N.Y.; 1964; pp. 271–276.

Primary Examiner—Hubert Lorin
Attorney, Agent, or Firm—Oblon, Spivak, McClelland, Maier & Neustadt

[57] ABSTRACT

A method of molding oriented structural yarn/polymer matrix composite structural articles in which a preform of oriented yarn layers saturated with a resin is placed in a shape-defining mold, which is put in an enclosure, and subjected to heat and pressure to cure the resin, after which a cooling medium may be introduced. To enable the use of lightweight multi-part molds, and a mixture of pressure is distributed evenly, an internal liner is collapsed about the mold prior to curing. The process is extremely productive, and allows for accuracy and reproducibility through the use of real time temperature monitoring and closed loop feedback control.

10 Claims, No Drawings

HIGH SPEED PROCESS FOR PRODUCTION OF ORIENTED STRUCTURAL YARN/POLYMER MATRIX COMPOSITE STRUCTURAL PARTS

BACKGROUND OF THE INVENTION

1. Field of the Invention

This invention addresses the art of manufacture of composite structural parts comprised of oriented structural yarns presented in a cured polymer matrix. More particularly, this invention deals with the curing of such materials, in a high speed and accurate fashion.

2. Background of the Prior Art

Oriented structural yarn/polymer matrix composites are receiving increasing attention in the work place in applications calling for high strength, good temperature resistance, good corrosion resistance, and at the same time, reduced weight and therefore energy savings. See, generally, Chou et al, Composites, Scientific American, October 1986, 193-203. These structural hybrid materials will constitute an increasingly large, and important, portion of the aerospace technology of this country in the foreseeable future, and contribute heavily to critical industries including the military.

In general, oriented structural yarn/polymer matrix composites can be characterized as comprising at least one layer, usually a plurality of layers, of structural yarns, the yarns being oriented in a precise direction. It is frequent to have differing orientations in varying layers, although, for the most part, in any given layer, the orientation of all yarns is substantially similar. This is to enhance load distribution, and greatly increases the overall strength of the composite part.

Structural yarns can be thought of as those yarns having a high modulus of elasticity (Young's), in excess of about 8-10 million. Certain forms of glass fibers, most carbon yarns, boron yarns and the like all fall in this class. Other members of the class, without limitation, include polyamides, and within that, such polyaramides as Kevlar TM. Hybrid yarns are also known, and occasionally, lower modulus, but exceedingly high tensile strength yarns, such as nylon, may be employed for structural purposes.

The plurality of layers can be held together, initially, by some sort of adhesive or stitching. Eventually, these are saturated with, and surrounded by a polymer matrix, which is cured, to provide a high strength, lightweight article. The majority of resins currently employed for this purpose are thermosetting resins, and exemplary among them may be epoxys, polyesters and the like. Certain resins, including those designated in Peek, are thermoplastic, and because of their outstanding temperature performance, are receiving increased attention in the work place.

In addition to their highly desirable physical characteristics, these products offer enhanced potential in parts consolidation and high strength to weight ratio. However, the composites currently available remain expensive, particularly in such exacting technologies as the aerospace market. One reason for this high cost is the continued high cost of processing materials, particularly, the high cost involved in transforming the resin-saturated uncured intermediate into a cured, stiff and strong product. Whatever process is employed for this transformation must be relatively rapid to reduce cost and enhance deliverability, but, at the same time, ensure accurate, precise, repeatable molding, such that the exceedingly narrow tolerances of the aerospace market are met.

Conventional methods for curing these composite articles include autoclaving, and compression molding. Neither is ideal, for a variety of reasons. Compression molding is capital intensive. It is also limited to the production of short articles, and cannot be used to make articles greater than about 8 feet long. On the other hand, autoclaving tends to be a much slower process. Frequently, curing cycles, from initial start up to the end of cool down, exceed six hours and more. To overcome this problem, it is frequently the practice to cure several articles in a single autoclave cycling. The problem encountered is the fact that, whatever type of processing controls are maintained, they tend to be based on a "worst case" of the characteristics of the individual parts being processed, at best, and, due to the fact that the heat transference is through the air, the process is extremely energy intensive at higher speed. Thus, the critical need for accuracy is difficult to achieve.

SUMMARY OF THE INVENTION

It is, accordingly, one object of this invention to provide a process whereby oriented structural yarn/polymer matrix composites can be molded to a specific or desired shape with shortened cure cycles, with reproducible results within very narrow dimensional tolerances.

It is another object of this invention to provide a process for the molding of this type of composite part which allows for verification dy data acquisition and extremely precise, repeatable control over the curing cycle of a composite part.

It is a further object of this invention to meet the above-noted deficiencies of the prior art.

These and other objects made clear below are met by a process for molding oriented structural yarn/polymer matrix composite parts that relies on features of both autoclaving and compression molding, and is referred to under the trademark designation Autocomp ®. The process begins with the provision of a resin-saturated oriented structural yarn article, designated a preform. The preform is wet, drapable, and to some degree, susceptible to permanent distortion. The preform is placed in a shape-defining mold, corresponding to the shape of the desired article. The mold may be heated prior to placing the preform thereon, in order to ensure that the resin saturating the article remains flowable, and at the temperature necessary for handling. The mold, which is lightweight, and of as many parts as necessary to accurately define the configuration of the desired article, is placed in an enclosure, which is then sealed. The enclosure bears a fluid impermeable envelope or sheet in its interior, which is fixed either to an insert on the interior wall of the enclosure, or a support extending across the interior of the enclosure, on which support the lightweight mold is placed. The air on the mold side of the sheet is evacuated, to collapse the sheet about the mold and put vacuum on the mold cavity. Thereafter, the enclosure is pressurized, placing substantial pressure closing the mold, and resisting movement of the mold during curing.

During pressurization, and according to a preestablished temperature history profile, heating means, generally preferably resistance heating elements, in the molds are activated, to rapidly increase the polymer to the desired curing temperature. These temperatures may range as high as 250°-850° F. for certain resins.

After the temperature has been raised to the necessary level for curing over the desired "ramp" including, if necessary, a high temperature hold and post-cure, a cooling medium, desirably ambient air or plant water, is introduced to the enclosure, to rapidly cool the mold, and the now-cured article contained therein. The mold is withdrawn and the article taken therefrom.

In preferred embodiments, a compatic control system controls the molding process and includes a straight forward data acquisition and monitoring system, to monitor and, where necessary, continuously correct the temperature within the part during curing, to ensure that all portions of any individual part are cured to the desired degree. This correction is a real time correction, so that the actual temperature corresponds to the prescribed temperature history profile within a specified range and time limit.

DETAILED DESCRIPTION OF THE INVENTION

As noted, this process begins with the provision of a resin-saturated array of oriented structural yarns, generally in a plurality of layers. It is generally unimportant as to how this preform is provided, however, in particularly preferred embodiments, the preform is prepared from dry fibers or a fiber form, which may be prepared according to the process disclosed in U.S. patent application Ser. No. 803,226, Vees et al, now U.S. Pat. No. 4,681,049, the entire content of which is incorporated herein by reference. Essentially, in that process, the fabric bearing the necessary layers of oriented yarns is prepared, and then bent around a form containing an opening which defines the final 3-dimensional shape of the article. The fabric is clamped or otherwise fixed to the form bearing the opening. As the fabric is bent, the yarns shift, to maintain a constant degree of bias or angle around any curve that the article may exhibit. This fabric is then secured by stitching therethrough, or adhering the layers and the fabrics together with a fixative, or adhesive. The preform is thereafter trimmed to final dimensions and, where necessary, flanges are provided by bending and sewing or otherwise fixing in position at the appropriate places.

A fiber form prepared according to this process, or any dry fiber form, may be saturated with resin through a resin film infusion process, RFI, which calls for the use of films of resin or some other conventional resin application means. The article is placed in a chamber which is provided with a heating means, preferably a selectively operable bank or array of quartz lamps. On top of the article is placed one or more films of the desired resin, or a quantity of melted resin in sufficient amount to wet out the entire fiber form. The chamber is then closed, and evacuated. The heating means is activated, and the temperature of the resin is increased to the degree necessary to sufficiently lower the viscosity of the resin until it penetrates the entire fiber form, in the process, saturating the fiber form. Of course, care must be taken not to raise the temperature to an unacceptable degree at which point the resin will begin to cure too much.

Since the chamber is evacuated, trapped air and moisture are released from the resin, and, when saturated, the preform is ready for Autocomp ® molding.

Because of the sensitivity of many resins to relatively slight temperature variation, and the need to meticulously control the "degree of cure" or thermal exposure of the resin, it is desirable to monitor, and correct, the heat of the fiber form, and the resin flowing therein. To this end, thermocouples are placed in the fiber form prior to evacuation. The sensed temperature of the resin may be fed to a data acquisition and control means, or similar computer or micro-processor assisted hardware and operation, such that the heating means is responsively controlled to maintain the temperature of the resin according to the desired temperature profile. This control may be "real-time", that is, the temperature is sensed and automatically regulated during the actual processing, so that the actual temperature of the resin corresponds to the prescribed temperature history profile within specified limits of control and within a minimum time. In preferred embodiments, each chamber, termed an "RFI chamber", or several such chambers, is connected to a single microprocessor, responsible for monitoring the appropriate thermocouples, and controlling the necessary heating means. The microprocessor is integrated with either a main computing means, or some other type of data acquisition and control means, whereby the thermocouple readings are compared against the established and desired profile, and, pursuant to that comparison, the heating means controls are activated, to bring the actual temperature of the resin into conformance with the projected or desired temperature.

While the preform is being prepared, the shape-defining mold is heated to a temperature necessary to maintain the resin in its liquid state, without substantial curing. This temperature is very often closely related to the temperature obtaining the resin itself during fiber form - resin saturation. The preform is placed in the heated mold, and the heated mold is closed, and placed in an enclosure which is provided with means for pressurizing the enclosure and venting the interior envelope. A release coating may be applied to the interior of the mold prior to receiving the preform. The enclosure can be of any shape, save that it is sufficient to entirely contain the mold. Inside the enclosure is a sheet or envelope of material impervious to fluid, which is attached to the inner wall of the enclosure, and is collapsable. Such an apparatus is described in U.S. Pat. No. 3,559,236 Merritt. Although this patent discloses the liner as being provided entirely around the opening of the enclosure or pressure-resistant vessel, in the practice of this invention, the liner may be attached, at either end, to a plate or shelf extending through the enclosure. The mold is placed on the shelf.

In an alternative embodiment, a resin, such as the epoxy resin from Shell designated Shell 9400, which is liquid at room temperature may be used. In this case, no RFI chamber is necessary, and the mold is not preheated.

Once the enclosure is sealed, the air within the liner is evacuated, so as to collapse the liner about the mold in a fashion so as to apply uniform pressure to all portions of the mold. This again is disclosed in U.S. Pat. No. 3,559,236, and, as discussed therein, allows the use of lightweight multi-section molds, in place of the heavier articles commonly employed in this art.

As the liner is collapsed, the enclosure article of the liner is pressurized. Th pressurizing medium may simply be ambient air, in view of the low cost involved therewith. The pressure in the enclosure is raised to a sufficient degree to close the mold, and to maintain the mold in position, without shifting during curing. While the enclosure is pressurized, heating means contained within the mold, preferably resistance heating elements, are activated, rapidly raising the temperature of the mold, and therefore, the resin saturated preform retained therein, to the necessary temperature required to provide the sufficient and desired degree of cure in the resin. As those of skill in the art are aware, the temperature profile is frequently not desired to be flat, but rather, involves a ramp of steadily increasing temperatures, plateaus at maximum temperatures, and possibly small increases between plateaus. One of the desirable features of the claimed invention is that whatever ramp is necessitated by the resin selected can be matched in the process, providing the user a wide freedom in resin selection. Once the necessary thermal exposure is completed, a cooling medium, preferably either air or recirculated water from the plant in which the process is practiced, is introduced into the chamber, while pressurization is maintained. This is necessary to avoid shifting of the mold as the molded part cools. When the mold is cooled, it is withdrawn from the enclosure, and trimmed to final dimension.

In an alternative embodiment, the molded part may exhibit projections, e.g., bosses, which, if the part were quickly cooled, would "lock" the part in the mold. In such situations, it may be desirable to remove the mold after heating, and allow the part to air cool.

As noted, the process of this invention is particularly desirable in that it allows the user a wide freedom of resin and structural yarn choices. The process is further desirable in that it provides for local temperature control over the geography/topography of the preform being molded. Thus, in preferred embodiments the molding enclosure, is provided with temperature monitoring and control means, which modified enclosure is termed the "Autocomp ®". Thus, embedded in the door or side of the enclosure itself are several thermocouple connections which may be attached to the mold or the thermocouples placed in the part being molded. These mold thermocouples are related to actual thermocouples which, by virtue of the closing of the mold, are present in the preform itself. The data collected from all of these thermocouples, as the temperature of the preform is increased, is correlated with the temperature control means. Thus, if the temperature of the preform, overall, is below that of the desired ramp, the heating means is automatically actuated to increase the temperature, to bring it into compliance with the projected profile. Moreover, and perhaps more importantly, local control over a portion of the preform may be practiced. Thus, if the mold is provided with a plurality of heating means, and temperature at a particularly thick portion of the preform is sensed as being below that of the remaining portion, and a uniform degree of cure is desired, that portion of the heating means corresponding to, or overlying, that portion of the preform will be selectively activated, to bring the local temperature into conformance with the rest of the preform, and the desired profile. Again, as with the RFI, this data acquistion and control can be real-time control and adjustment, whereby imbalances or departures from the profile in the preform being processed are sensed and automatically acted upon.

In particularly preferred embodiments, to simplify operation, each RPI chamber, and each Autocomp ®, or several such devices are provided with a microprocessor, which is interfaced, through a conventional data acquisition means. The operator inputs a desired temperature ramp or profile of the part being molded for both the RFI and the Autocomp ® and gives that profile a certain part designation. The plant worker, receiving a part with that designation, simply calls it up on the microprocessor at the specific apparatus for which he is responsible. This activates the interface, and the entire process, thereafter, is automatic. The only manual step involved, which might involve thermal exposure of the resin and preform, thereby effecting cure and performance, is the transfer of the preform to the mold. The time over which such transfer occurs is very short, and heating the mold to essentially the temperature of the resin within the part in the RFI chamber further reduces the consequence of any thermal exposure. As a result, repeatable, highly accurate molding is accomplished, parts having the same finished dimension, with the same degree of cure, and thereby, predictable performance.

Of course, when molding a thermoplastic, the cooling cycle may be far more critical than the heating cycle. In such a case, the mold is provided not only with heating means, but cooling means as well, such as interior chambers in which a cooling medium is circulated. In this case, the several thermocouples and control system is sensitive to the cooling of the article, and, as deviations from the profile are sensed within the preform, occur, the flow of coolant, and the temperature of the coolant, is appropriately modified.

In actual processing, using a fiber form comprised of oriented graphite structural yarns, and the typical aerospace epoxy resin system 3501-6 (Hercules), in an embodiment up to 56 yarn layers thick, the total curing cycle, from beginning to end of cooling, ran no more than 2 hours. And the product tolerances were easily reproducible.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States patent is:

1. A process for molding an oriented structural yarn-/polymer matrix composite comprised of at least one layer of oriented structural yarns in a polymer matrix, comprising:

provinding an uncured preform comprised of oriented structural yarns saturated with a curable resin, placing said article in a shape-defining mold which has been heated to a temperature sufficient to maintain said resin in a liquid state, said mold bearing internal heating means.

placing said mold in a pressurizable enclosure bearing an internally collapsable, fluid-impermeable liner therein, said liner lying between the interior of said enclosure and said mold, collapsing said liner about said mold in a fashion so as to apply vacuum to the mold cavity and uniform pressure about said mold by evacuating the space between said mold and said liner, pressurizing said enclosure, activating said mold heating means to a temperature and for a time sufficient to cure said resin, introducing a cooling medium, under pressure, to said enclosure to cool said mold and the cured part contained therewithin, releasing the liner form said mold, withdrawing the mold from said enclosure, removing the part from said mold and trimming said part to final dimension.

2. The process of claim 1, further comprising monitoring the temperature of said preform during said heating process, and automatically controlling said heating means as a function of the information obtained by said monitoring, to maintain the temperature of said perform at a predetermined level.

3. The process of claim 1, wherein said step of providing an uncured preform comprised of oriented structural yarn saturated with a curable resin comprises forming a dry fiber form of a plurality of layers of oriented structural yarns, conforming said fiber form to approximately the desired shape of the cured article, placing said fiber form in a chamber provided with heating means and placing resin film on top of said fiber form, sealing said chamber, evacuating said chamber and activating said heating means so as to reduce the viscosity of said resin to a level where it saturates the fiber form, simultaneously degassing said resin, and withdrawing the now-saturated preform from said chamber.

4. The process of claim 3, wherein the temperature of said fiber form to be resin saturated is monitored during said saturation process, and said heating means is automatically and selectively activated to increase the amount of heat delivered, so as to maintain said fiber form at a preselected temperature.

5. The process of claim 4, wherein both said steps of saturating said fiber form with resin, and heating said mold are subject to monitoring, such that the actual temperature of the composite article being worked on is constantly monitored, and the heating means responsible for heating said article is automatically controlled in response to the monitored temperature, such that the temperature of the article is maintained at a preselected temperature, according to a preselected temperature profile.

6. The process of claim 1, wherein said preform comprises a plurality of layers of oriented structural yarns, said yarns being selected from the group consisting of glass fibers, carbon, polyamide, polyaramide, boron and mixtures thereof, and said resin is either thermoplastic or thermosetting.

7. The process of claim 6, wherein said resin is thermosetting and selected from the croup consisting of epoxy, bismalimide, polyimide and polyester resins.

8. The process of claim 6, wherein said resin is thermoplastic.

9. A process for molding an oriented structural yarn/polymer matrix composite part comprised of at least one layer of oriented structural yarns in a polymer matrix, comprising:
providing an uncured preform comprised of oriented structural yarns saturated with a curable resin,
placing said article in a shape-defining mold which has been heated to a temperature sufficient to maintain said resin in a liquid state, said mold bearing internal heating means,
placing said mold in a pressurizable enclosure bearing an internally collapsable, fluid-impermeable liner therein, said liner lying between the interior of said enclosure and said mold,
collapsing said liner about said mold in a fashion so as to apply vacuum to the mold cavity and uniform pressure about said mold by evacuating the space between said mold and said liner,
pressurizing said enclosure,
activating said mold heating means to a temperature and for a time sufficient to cure said resin,
releasing the liner from said mold,
withdrawing the mold from the enclosure and allowing the part to cool under temperature conditions which prevent the part from being locked into the mold, and trimming said part to final dimension.

10. A process for molding an oriented structural yarn/polymer matrix composite comprised of at least one layer of oriented structural yarn/polymer matrix, comprising:
providing an uncured preform comprised of oriented structural yarn saturated with a curable resin which is liquid at ambient conditions,
placing said article in a shape-defining mold, said mold bearing internal heating means,
placing said mold in a pressurizable enclosure bearing an internally collapsible, fluid-impermeable liner therein, said liner lying between the interior of said enclosure and said mold,
collapsing said liner about said mold in a fashion so as to apply vacuum to the mold cavity and uniform pressure about said mold by evacuating the space between said mold and said liner,
pressurizing said enclosure,
activating said mold heating means to a temperature and for a time sufficient to cure said resin,
introducing a cooling medium, under pressure, to said enclosure to cool said mold and the cured part contained therewithin,
releasing the vacuum drawn on the interior of said liner to release the liner from said mold,
withdrawing the mold from said enclosure, removing the part from said mold and trimming said part to final dimensions.

* * * * *